US008521147B2

(12) United States Patent
Rodriguez Fonollosa et al.

(10) Patent No.: US 8,521,147 B2
(45) Date of Patent: Aug. 27, 2013

(54) METHODS AND SYSTEMS FOR DECENTRALIZED MANAGING OF NEIGHBORING FEMTOCELLS

(75) Inventors: Javier Rodriguez Fonollosa, Esplugues de Llobregat (ES); Adrián Agustin De Dios, Fraga (ES); Olga Muñoz Medina, Barcelona (ES); Josep Vidal Manzano, El Masnou (ES)

(73) Assignee: Universitat Politecnica de Catalunya, Barcelona (ES)

( * ) Notice: Subject to any disclaimer, the term of this patent is extended or adjusted under 35 U.S.C. 154(b) by 0 days.

(21) Appl. No.: 13/311,904

(22) Filed: Dec. 6, 2011

(65) Prior Publication Data

US 2013/0137412 A1      May 30, 2013

(30) Foreign Application Priority Data

Nov. 28, 2011   (EP) .................................. 201131913

(51) Int. Cl.
*H04M 3/00*    (2006.01)
*H04B 1/00*    (2006.01)
(52) U.S. Cl.
USPC ........................ 455/418; 455/424; 455/63.1

(58) Field of Classification Search
None
See application file for complete search history.

(56) References Cited

U.S. PATENT DOCUMENTS

| 2009/0291690 A1* | 11/2009 | Guvenc et al. ................ 455/444 |
| 2010/0184423 A1* | 7/2010 | Kent et al. .................. 455/422.1 |
| 2011/0151862 A1* | 6/2011 | French et al. ................. 455/424 |

* cited by examiner

*Primary Examiner* — Erika A Washington
(74) *Attorney, Agent, or Firm* — Hess Patent Law Firm LLC; Robert J. Hess

(57) ABSTRACT

Methods and systems to decentralize managing of neighboring femtocells. The methods and systems include communication to a first femtocell from a second femtocell of next information that includes communicated information of: i) the interference requirement constraint of an active user of the second femtocell, and ii) one or more parameters characterizing a physical radio channel defined from the first femtocell to the at least one active user of the second femtocell; the self-configuration of the transmission parameters of the first femtocell based upon the communicated information i) and ii). Another method (and system to implement the method) includes the mutual adjustment of the interference requirement constraints between a first and a second femtocell, regarding their active users, in a decentralized manner, on the basis of not affecting the transmission performance of the rest of the plurality of femtocells.

20 Claims, 3 Drawing Sheets

METHODS AND SYSTEMS FOR DECENTRALIZED MANAGING OF NEIGHBORING FEMTOCELLS

FIELD OF THE INVENTION

This invention relates to the field of communication. More specifically, the invention relates to methods and systems for decentralized managing of neighboring femtocells, including the self-configuration of transmission parameters and the adjusting of interference requirement constraints in a femtocell network.

BACKGROUND OF THE INVENTION

A femtocell is a small base station that is deployed in the households or small business environment to get better indoor voice and data coverage, improving at the same time the macrocell reliability. They are a cost-effective solution, able to improve the spectrum efficiency of the network and additionally increase the peak-bit rate in low coverage areas. Femtocells, like macro base stations, may be enabled to communicate to a cellular network by an IP-based backhaul link, which may be a digital subscriber line (DSL) connection or a cable or fiber connection for example.

There are many technical studies and business models elucidating the outstanding potential of femtocells in terms of increasing the network capacity, saving energy and providing benefits from the social and economic side, indicating the femto-based networks as a substantial technological breakthrough on future mobile networks. However, macrocells and femtocells use the same spectrum, originating interference and imposing additional horizontal handover issues that need to be administrated. In addition, the industries are concerned because all the envisaged benefits are not straightforward to achieve, due to major technical and non-technical challenges. In particular, one of the main technical problems comes from the fact that a massive deployment of femtocells will pose serious issues on the radio interference management between the macro and femto layers and among neighboring femtocells.

Conventional solutions like the one described in US 2010/0246482 A1, US 2010/254319 A1 or 2010/0065328 A1 propose the employment of a centralized management entity, which collects radio parameters from the neighboring femtocells and determines and communicates the required transmission configuration for each of them. The main limitation of such methods is the fact that any change in the radio parameters experienced by a single femtocell requires its notification to the centralized management entity and the reconfiguration of the transmission parameters of the plurality of the femtocells. Other solutions like the methods proposed in US/2009 0316649 A1 or US/2010 0111022 A1 are decentralized, i.e. do not require the existence of a centralized management entity, and allow the self-configuration of femtocells when integrated in an existing femtocell network. However, owing to the lack of communication with the neighboring femtocells, these techniques cannot guarantee efficient utilization of the radio resources and, simultaneously, avoidance of performance degradation to the existing femtocell network. In fact these inventions might be affected by the hidden node problem, a well known problem for a person having ordinary skill in the art, since no procedure is envisaged to control the level of the interference generated to the mobile units served by neighboring cells. The method described in US 2010/0054196 A1 however includes the possibility of direct communication among interfering femtocells in order to coordinate antenna radiation patterns and resource allocation parameters in a distributed manner. Nevertheless, the claimed methods again do not guarantee efficient utilization of the available spectrum and, simultaneously, that the aggregate interference level as perceived by any of the femtocell users is kept below a given value. In fact the claimed methods attempt to minimize the aggregate interference using coordinated configuration of transmission parameters but cannot guarantee any specific maximum value. In addition and most importantly, the proposed methods are not well suited to the initial configuration of a femtocell when integrated in an operational femtocell network since they require initiation of a negotiation phase with all neighboring femtocells at start-up.

Further limitations and disadvantages of conventional and traditional approaches will become apparent to one of skill in the art, through comparison of such systems with some aspects of the present invention as set forth in the remainder of the present disclosure.

The research of the present invention has received funding from the Seventh Framework Programme of the EU [FP7/2007-2011] under grant agreement n° ICT-248 891 STP FREEDOM

SUMMARY OF THE INVENTION

This disclosure generally relates to methods and systems for decentralized managing of neighboring femtocells.

A first aspect of the invention concerns to a method for decentralized managing of neighboring femtocells, comprising:

the communication to a first femtocell from at least a second femtocell of a plurality of neighboring femtocells of the next information:
  i) the interference requirement constraint of at least one active user of said second femtocell, and
  ii) at least one parameter characterizing at least one physical radio channel defined from the first femtocell to said at least one active user of the second femtocell;
the self-configuration of the transmission parameters of said first femtocell by using at least the communicated information i) and ii).

Said transmission parameters comprise, depending on the embodiment, transmission power and/or transmission rate and/or transmit steering vector.

By interference requirements constrains it is generally understood the maximum values of interference power that an active user equipment in a given femtocell can receive from each of the neighboring femtocells without degrading the active communication link with said given femtocell.

For one embodiment, the method of the first aspect further comprises the communication from said first femtocell to at least said second femtocell and/or to other femtocell of said plurality of femtocells of the next information:
  the interference requirement constraint of at least one active user of the first femtocell, and
  at least one parameter characterizing at least one physical radio channel defined from said second and/or other femtocell to said at least one active user of the first femtocell.

Said at least one parameter characterizing said at least one physical radio channel is, for some embodiments, at least one of the link attenuation and the complex vector channel, said complex vector channel including link attenuation.

For one embodiment of the method, at least one among the plurality of femtocells and the active users are equipped with one, two, three, four or more antennas and at least part of the femtocells communicate the link attenuation and phase, by means of said complex vector channel, from at least one of the antennas of another femtocell to at least one of the antennas of the active users bonded to said at least part of the femtocells performing said communication.

For some embodiments, said step ii) is performed for one or a plurality of carrier frequencies in a multicarrier system used for communicating said second femtocell with a plurality of active users.

The method of the first aspect further comprises, as per one embodiment, said first femtocell acquiring knowledge of said at least one parameter characterizing said radio channel with respect to radio channels defined between said first femtocell and each of a plurality of own users, for a plurality of carrier frequencies in a multicarrier system.

According to one embodiment, the method of the first aspect further comprises each of the own users of the first femtocell requesting a transmission rate and informing the first femtocell of its required interference requirement constraints from each other of said plurality of neighboring femtocells at each carrier frequency in a multicarrier system.

The method of the first aspect comprises, for one embodiment, performing said self-configuration of said transmission parameters using the Waterfilling technique.

As per one embodiment, the method of the first aspect comprises using the self-configured transmission parameters to perform carrier allocation among users of the first femtocell, making sure that the interference generated to the remaining of the plurality of neighboring femtocells is kept below the communicated interference requirement constraints.

For a further embodiment, herein below called interference adjustment embodiment, the method of the first aspect comprises the mutual adjustment of the interference requirement constraints between the first femtocell and at least the second femtocell.

A second aspect of the invention relates to a method for decentralized managing of neighboring femtocells, comprising the mutual adjustment of the interference requirement constraints between a first femtocell and at least a second femtocell of said plurality of femtocells, regarding their active users, in a decentralized manner, said mutual adjustment being performed on the basis of not affecting the transmission performance of the rest of said plurality of femtocells.

For one embodiment of the method of the second aspect of the invention, the method comprises, once said interference requirement constraints mutual adjustment has been performed, setting new values for at least part of the transmission parameters for said first and second femtocells.

The method of the second aspect of the invention comprises, for one embodiment, performing said adjustment of interference requirement constraints and setting of new values for at least part of the transmission parameters without violating the interference requirement constraints for the rest of said plurality of femtocells.

According to one embodiment, the method of the second aspect comprises performing said adjustment of interference requirement constraints by means of the next actions:

the mutual communication between said first femtocell and at least said second femtocell of their mutual interference requirement constraints and of the variation in the values of at least part of their transmission parameters that they would experience when changing their mutual interference requirement constraints;

the determination of the adjusted or updated mutual interference requirement constraints that allow to vary the values of at least part of the transmission parameters of said first and second femtocells without affecting the transmission performance of the rest of said plurality of femtocells; and the setting of the new values of at least part of the transmission parameters for said first and second femtocells according to said determination.

The method of the second aspect comprises, as per one embodiment, performing said mutual communication of their mutual interference requirement constraints and of the variation in the values of the transmission parameters that they would experience when changing their mutual interference requirement constraints, between said first femtocell and at least part of said plurality of femtocells, and finding said second femtocell, out of said plurality of femtocells, as the one with which the adjustment of the mutual interference requirement constraints with the first femtocell is mutually beneficial regarding said variation in the values of at least part of the transmission parameters.

Said setting of new values of the transmission parameters for said first and second femtocells comprises, for an embodiment of the method of the second aspect:

to increase the total transmission rate or to reduce the total transmission power of said first femtocell; and/or to increase the total transmission rate or to reduce the total transmission power of said second femtocell, and/or to increase the total transmission rate of said first femtocell and to reduce the total transmission power of said second femtocell, or vice versa.

According to one embodiment of the method of the second aspect, said transmission parameter which values are to be varied and set is:

transmission power, if said first femtocell can jointly satisfy the transmission rate requirements of all users connected there to, or transmission rate, if said first femtocell cannot jointly satisfy the transmission rate requirements of all users connected there to.

The above description related to different embodiments of the method of the second aspect of the invention also refers to different variants of the interference adjustment embodiment of the method of the first aspect of the invention.

A third aspect of the invention relates to a system for decentralized managing of neighboring femtocells, comprising a second femtocell in communication with a first femtocell of a plurality of neighboring femtocells to deliver the latter with the next information:

i) the interference requirement constraint of at least one active user of said second femtocell, and ii) at least one parameter characterizing at least one physical radio channel defined from the first femtocell to said at least one active user of the second femtocell;

wherein said first femtocell is adapted to self-configure its transmission parameters by using at least the communicated information i) and ii).

The system of the third aspect of the invention is configured to implement the method of the first aspect.

By the method and system of the first and third aspects of the invention, a decentralized self-configuration in a femtocell network is provided for femtocells incorporating therein in which the downlink transmission parameters of each one of said incorporating femtocells are adjusted to satisfy the interference requirement constraints determined by the remaining of a plurality of femtocells.

A fourth aspect of the invention relates to a system for decentralized managing of neighboring femtocells, comprising a first femtocell and at least a second femtocell of said plurality of femtocells configured to mutually adjust the interference requirement constraints between them, regarding their active users, in a decentralized manner, said mutual adjustment being performed on the basis of not affecting the transmission performance of the rest of said plurality of femtocells.

The system of the fourth aspect of the invention is configured to implement the method of the second aspect.

By the second and fourth aspects of the invention, a method and system are provided for i) increasing the total transmission rate or ii) reducing the total transmission power or iii) increasing the total transmission rate in one and reducing the total transmission power in the other of any two of a plurality of femtocells without surpassing the interference requirement constraints determined by the remaining of a plurality of femtocells.

The systems and methods of the present invention are applicable for any femtocell, microcell or macrocell base station with an IP-based backhaul link operating ADSL, ADSL2, ADSL2+, VDSL2, FTTx technologies or any other backhaul specification to the Core Network or to the Internet serving mobile or fixed wireless equipment terminals equipped with one, two, three, four or more antennas and configured to operate IS-95, CDMA, GSM, TDMA, GPRS, EDGE, UMTS, WCDMA, OFDM, OFDMA, TD-SCDMA, HSDPA, LTE, LTE-A, WiMax, 3GPP, and/or 3GPP2 signals.

The present invention circumvents the limitations of the prior art proposals by providing two main advantages, depending on the embodiment:

i) Provides a system and method for decentralized self-configuration of femtocells at start-up that does not interfere with the existing operational femtocell network. In fact neighboring femtocells are given the possibility to set a maximum interference power allowed for each of their bonded users thus guaranteeing their seamless operation unaffected by the introduction of the new femtocell;

ii) Provides a system and method which can be used by mutual agreement of any pair of neighboring femtocells in order to reconfigure in a decentralized fashion their transmission parameters to benefit from increased transmission rate or reduced transmitted energy.

BRIEF DESCRIPTION OF THE DRAWINGS

The previous and other advantages and features will best be understood by reference to the following detailed description of several illustrative and not limitative embodiments when read in conjunction with the accompanying drawing, wherein.

DETAILED DESCRIPTION OF THE INVENTION

Embodiment 1

Certain embodiments of the first and third aspects of the invention are found in a method and system for a decentralized self-configuration of the transmission power in one or several carrier frequencies of at least one of a plurality of femtocells to satisfy the interference requirement constraints determined and communicated by at least one or more of the remaining of a plurality of femtocells. Femtocells may be enabled to receive and utilize interference requirement constraints from one or more of the remaining of a plurality of femtocells in order to configure the transmission parameters, like for example the transmission power in one or several carrier frequencies. In this embodiment femtocells and active users are assumed to be equipped with only one antenna.

Figure 1:
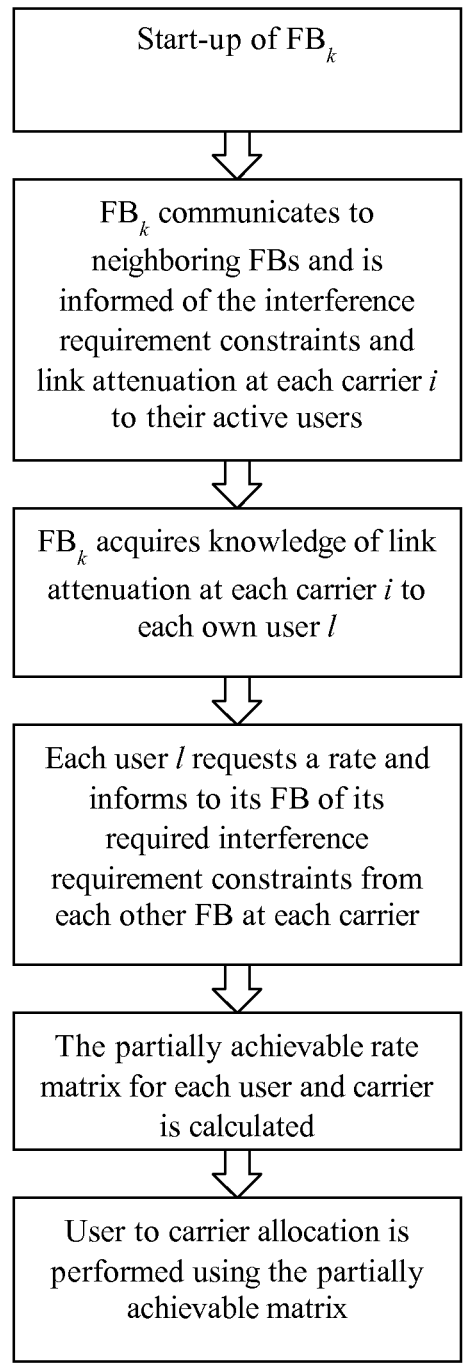
FIG. 1 is a flow chart regarding a first embodiment of the method and the system of the first and third aspects of the invention, according to a SISO scheme.

FIG. 1 illustrates the block diagram corresponding to Embodiment 1 as applied to a multicarrier cellular communication system. At start-up the femtocell $FB_k$ establishes communication to the neighboring femtocells $FB_j$ and is informed of the interference requirement constraints $\Gamma_{kj}^{(i)}$; $\forall i,j$ and link attenuation $\rho_{kj}^{(i)}$; $\forall i,j$ at each carrier i to their corresponding active users. Additionally, $FB_k$ acquires knowledge of the link attenuation at each carrier i to each own user l $\rho_{kk(l)}^{(i)}$; $\forall i, l$. Each user l of femtocell $FB_k$ requests a rate $R'_{k(l)}$ and informs of its required interference requirement constraints from each other neighboring femtocells $FB_j$ at each carrier frequency i, $\Gamma_{jk(l)}^{(i)}$; $\forall i, j$. Once all this information is available at femtocell $FB_k$, the partially achievable rate matrix for each user and carrier can be calculated using expression:

$$\forall i$$
$$\forall l$$
$$\text{Max} \log\left(1 + \frac{P_{k(l)}^{(i)} \rho_{kk(l)}^{(i)}}{\sum_{j=k} \Gamma_{jk(l)}^{(i)} + \sigma_{k(l)}^{(i)2}}\right) = R_{k(l)}^{(i)}$$
$$\text{s.t.} \begin{cases} P_{k(l)}^{(i)} \rho_{kj}^{(i)} \leq \Gamma_{kj}^{(i)}, \forall j \neq k \\ P_{k(l)}^{(i)} \leq P_k^{(i)} \end{cases}$$

where $P_k^{(i)}$ is the maximum transmitted power at carrier frequency i of femtocell $FB_k$. By partially achievable rate it is understood the Shannon Capacity limit for the transmission of user l using only carrier i and fulfilling the interference requirement constraints as communicated by the neighboring femtocells of the femtocell network. The mathematical solution to this optimization problem is well known and can be obtained by means of the waterfilling algorithm. The partially achievable rate matrix can then be employed to perform carrier allocation among all users of $FB_k$ making sure, that the interference generated to the remaining femtocells of the network is kept below the communicated interference requirement constraints. It could happen that for some cases there could be no guarantee that the rates requested by all users of $FB_k$ were satisfied, which has motivated the present inventors the development of a method like the one described in Embodiment 3.

Embodiment 2

Other embodiments of the first and third aspects of the invention are found in a method and system for a decentralized self-configuration of the power and transmit steering vector in one or several carrier frequencies of at least one of a plurality of femtocells to satisfy the interference requirement constraints determined and communicated by at least one or more of the remaining of a plurality of femtocells. Additionally, femtocells may be enabled to receive and utilize some parameters from one or more of the remaining of a plurality of femtocells in order to configure the transmission parameters, like for example the transmission power and transmit steering vector in one or several carrier frequencies. In this embodiment femtocells and active users can be equipped with one, two, three, four or more antennas.

Figure 2:
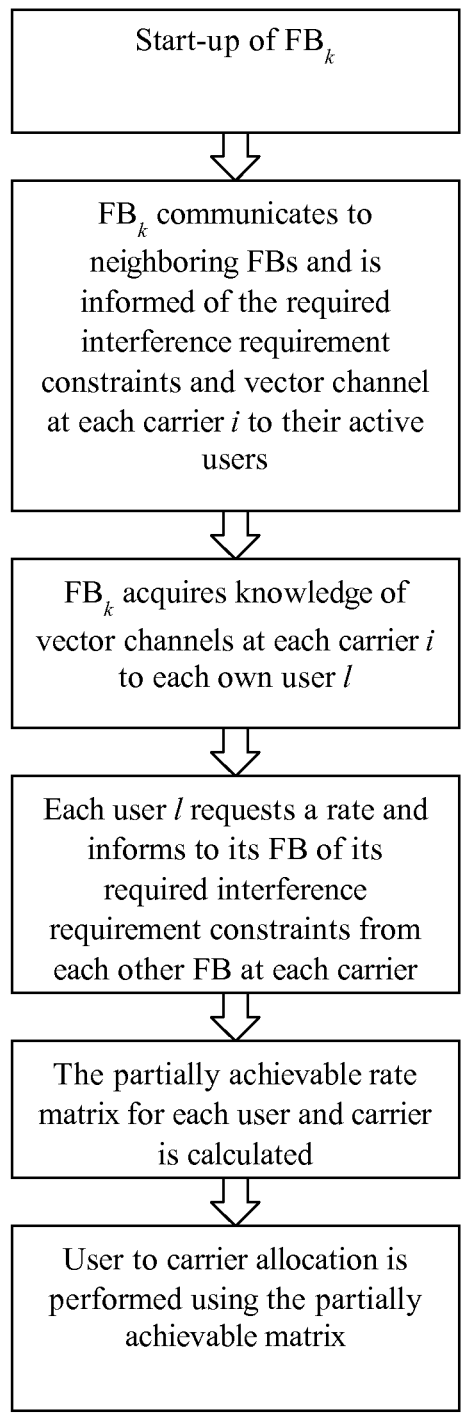
FIG. 2 is another flow chart regarding a second embodiment of the method and system of the first and third aspects of the invention, according to a MISO scheme.

FIG. 2 illustrates the block diagram corresponding to Embodiment 2 as applied to a multicarrier cellular communication system. At start-up the femtocell $FB_k$ establishes communication to the neighboring femtocells $FB_j$ and is informed of the interference requirement constraints $\Gamma_{kj}^{(i)}$; $\forall i, j$ and complex vector channel $h_{kj}^{(i)}$; $\forall i, j$ at each carrier i to their corresponding active users. Additionally, $FB_k$ acquires knowledge of the complex vector channel at each carrier i to each own user l $h_{kk(l)}^{(i)}$; $\forall i, l$. Each user l of femtocell $FB_k$ requests a rate $R'_{k(l)}$ and informs of its required interference requirement constraints from each other neighboring femtocells $FB_j$ at each carrier frequency i, $\Gamma_{jk(l)}^{(i)}$; $\forall i, j$. Once all this information is available at femtocell $FB_k$, the partially achievable rate matrix for each user and carrier can be calculated using expression:

$$\forall i$$
$$\forall l$$
$$\text{Max log}\left(1 + \frac{h_{kk(l)}^{(i)H} S_{k(l)}^{(i)} h_{kk(l)}^{(i)}}{\sum_{j=k} \Gamma_{jk(l)}^{(i)} + \sigma_{k(l)}^{(i)2}}\right) = R_{k(l)}^{(i)}$$

$$\text{s.t.} \begin{cases} h_{kj}^{(i)H} S_{k(l)}^{(i)} h_{kj}^{(i)} \leq \Gamma_{kj}^{(i)}, \forall j \neq k \\ Tr(S_{k(l)}^{(i)}) \leq P_k^{(i)} \end{cases}$$

where $S_{k(l)}^{(i)}$ is the transmit covariance matrix of the signal transmitted to user l at carrier frequency i of femtocell $FB_k$ and $P_k^{(i)}$ is the maximum transmitted power at carrier frequency i of femtocell $FB_k$. For the complex vector channel $h_{kj}^{(i)}$ or $h_{kk(l)}^{(i)}$ the superscript H indicates the Hermitian transpose. The mathematical solution to this optimization problem is also well known and can be obtained by means of a generalized waterfilling algorithm. The partially achievable rate matrix for each user l at each carrier i can then be employed to perform carrier allocation among all users of $FB_k$ making sure that the interference generated to the remaining femtocells of the network is kept below the communicated interference requirement constraints. It could happen that for some cases there could be no guarantee that the rates requested by all users of $FB_k$ were satisfied, which has motivated the present inventors the development of a method like the one described in Embodiment 3.

Embodiment 3

Embodiments of the second and fourth aspects of the invention provide a method and system for i) increasing the total transmission rate or ii) reducing the total transmission power or iii) increasing the total transmission rate in one and reducing the total transmission power in the other of any two of a plurality of femtocells without changing the interference requirement constraints determined by the remaining of a plurality of femtocells. At least one of the femtocells is enabled to exchange one or more parameters with at least one of the remaining femtocells and both can determine whereas a change of the interference requirements constraints mutually communicated to the other femtocell can imply an increase in its total transmission rate or a reduction of its total transmission power. In case this mutual interference constraint readjustment is found to be beneficial, i.e., can provide a total transmitted rate increase or a total transmitted power decrease to each of the two participating femtocells, the two said femtocells set the new transmission parameters accordingly. The remaining of a plurality of femtocells are unaffected by the reconfiguration of the two said femtocells and nothing needs to be communicated to them in this respect.

Figure 3:
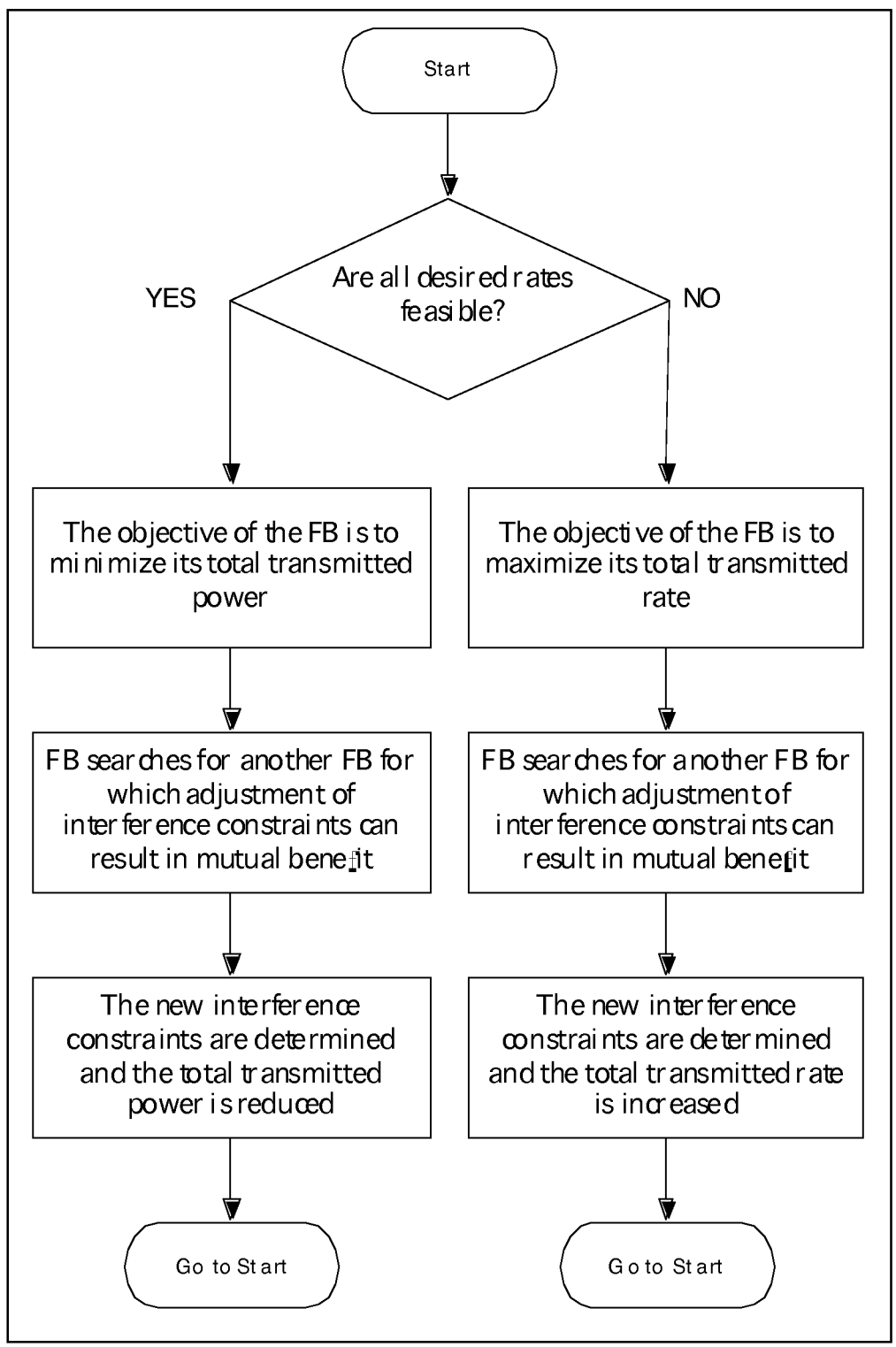
FIG. 3 is a further flow chart related to an embodiment of the method and system of the second and the fourth aspects of the invention.

FIG. 3 illustrates the block diagram corresponding to Embodiment 3 as applied to a multicarrier cellular communication system. Two different paths are defined in the method depending on whereas the rate requirements of all the users connected to femtocell k can be jointly satisfied or not. This fact determines the global optimization objective of femtocell k in possible collaboration with the neighboring femtocells, which can either be to increase the total transmitted rate or to reduce the total transmitted power. In both cases the femtocell starts communicating with the neighboring femtocells in order to assess the possibility of mutually adjusting the interference requirement constraints with each other if this adjustment happens to be beneficial for both of them, i.e. if each of them can either increase the total transmission rate or reduce the total transmitted power, without violating the interference requirements constrains for the remaining of the plurality of femtocells. Mathematically, this mutual benefit can be analyzed by checking the determinant of the following matrix:

$$\forall j$$

$$D_{kj}^{(i)} = \begin{bmatrix} \frac{\partial C_k^{(i)}(\Gamma_k^{(i)})}{\partial \Gamma_{kj}^{(i)}} & \frac{\partial C_k^{(i)}(\Gamma_k^{(i)})}{\partial \Gamma_{jk}^{(i)}} \\ \frac{\partial C_j^{(i)}(\Gamma_j^{(i)})}{\partial \Gamma_{kj}^{(i)}} & \frac{\partial C_j^{(i)}(\Gamma_j^{(i)})}{\partial \Gamma_{jk}^{(i)}} \end{bmatrix} \triangleq \begin{bmatrix} a & b \\ c & d \end{bmatrix}$$

where $$C_m^{(i)} = \begin{cases} P_m^{(i)} : \text{if } FB_m \text{ objective is to minimize power, } m = k, j \\ -R_m^{(i)} : \text{if } FB_m \text{ objective is to maximize rate, } m = k, j \end{cases}$$

Unless the determinant of matrix $D_{kj}^{(i)}$ is null, i.e. $|D_{kj}^{(i)}|=0$, $\forall i$, $k \neq j$, femtocells k and j can benefit from an adjustment of their mutual interference constraints. The updated interference constraints are computed as:

$$[\Gamma'_{kj}, \Gamma'_{jk}]^T = [\Gamma_{kj}, \Gamma_{jk}]^T + \partial_{kj} d_{jk}$$

where $$d_{jk} = \text{sign}(ad-bc)[d-b, a-c]^T$$

and $\partial_{kj} > 0$ is a small step-size. The superscript T denotes vector transpose. Once the interference requirements constraints have been adjusted the method returns to the initial state.

A person skilled in the art could introduce changes and modifications in the described embodiments, without departing from the scope of the invention as described in the enclosed claims.

What is claimed is:

1. A method for decentralized managing of neighboring femtocells, comprising:
   communication to a first femtocell from at least a second femtocell of a plurality of neighboring femtocells of next information, the next information including:
   i) an interference requirement constraint of at least one active user of said second femtocell, and
   ii) at least one parameter characterizing at least one physical radio channel defined from the first femtocell to said at least one active user of the second femtocell, wherein said at least one parameter characterizing said at least one physical radio channel is at least one of link attenuation and a complex vector channel, said complex vector channel including link attenuation; and self-configuration of transmission parameters of said first femtocell by using at least the communicated information of i) and ii).

2. The method of claim 1, further comprising the communication from said first femtocell to at least said second femtocell and/or to other femtocell of said plurality of femtocells of the next information:

the interference requirement constraint of at least one active user of the first femtocell, and at least one parameter characterizing at least one physical radio channel defined from said second and/or other femtocell to said at least one active user of the first femtocells.

3. The method of claim 2, wherein at least one among the plurality of femtocells and the active users are equipped with one, two, three, four or more antennas and at least part of the femtocells communicate the link attenuation and phase, by means of said complex vector channel, from at least one of the antennas of another femtocell to at least one of the antennas of the active users bonded to said at least part of the femtocells performing said communication.

4. The method of claim 1, wherein at least one among the plurality of femtocells and the active users are equipped with one, two, three, four or more antennas and at least part of the femtocells communicate the link attenuation and phase, by means of said complex vector channel, from at least one of the antennas of another femtocell to at least one of the antennas of the active users bonded to said at least part of the femtocells performing said communication.

5. The method of claim 1, wherein said step ii) is performed for at least one carrier frequency in a multicarrier system used for communicating said second femtocell with a plurality of active users.

6. The method of claim 5, wherein said step ii) is performed for a plurality of carrier frequencies in a multicarrier system used for communicating said second femtocell with a plurality of active users.

7. The method of claim 1, wherein said interference requirement constraint refers to the maximum value of interference power than an active user equipment in a given femtocell can receive from each of the neighboring femtocells without degrading the active communication link with said given femtocell.

8. The method of claim 1, wherein said transmission parameters comprise transmission power and/or transmission rate and/or transmit steering vector.

9. A method for decentralized managing of neighboring femtocells, comprising:

communication to a first femtocell from at least a second femtocell of a plurality of neighboring femtocells of next information, the next information including:

i) an interference requirement constraint of at least one active user of said second femtocell, and ii) at least one parameter characterizing at least one physical radio channel defined from the first femtocell to said at least one active user of the second femtocell;

self-configuration of transmission parameters of said first femtocell by using at least the communicated information of i) and ii); and further comprising said first femtocell acquiring knowledge of said at least one parameter characterizing said radio channel with respect to radio channels defined between said first femtocell and each of a plurality of own users, for a plurality of carrier frequencies in a multicarrier system.

10. The method of claim 9, further comprising each of said own users of said first femtocell requesting a transmission rate and informing the first femtocell of its required interference requirement constraints from each other of said plurality of neighboring femtocells at each carrier frequency in a multicarrier system.

11. The method of claim 10, comprising performing said self-configuration of said transmission parameters using the Waterfilling technique.

12. The method of claim 10, comprising using said self-configured transmission parameters to perform carrier allocation among users of said first femtocell, making sure that the interference generated to the remaining of said plurality of neighboring femtocells is kept below the communicated interference requirement constraints.

13. A method for decentralized managing of neighboring femtocells, comprising:

communication to a first femtocell from at least a second femtocell of a plurality of neighboring femtocells of next information, the next information including:

i) an interference requirement constraint of at least one active user of said second femtocell, and ii) at least one parameter characterizing at least one physical radio channel defined from the first femtocell to said at least one active user of the second femtocell;

self-configuration of transmission parameters of said first femtocell by using at least the communicated information of i) and ii);

the method further comprising:

communication from said first femtocell to at least said second femtocell and/or to another femtocell of said plurality of femtocells of the next information, the interference requirement constraint of at least one active user of the first femtocell, at least one parameter characterizing at least one physical radio channel defined from said second and/or another femtocell to said at least one active user of the first femtocell;

mutual adjustment of the interference requirement constraints between said first femtocell and at least said second femtocell, and once said interference requirement constraints mutual adjustment has been performed, setting new values for at least part of transmission parameters for said first and second femtocells;

performing said adjustment of interference requirement constraints and setting of new values for at least part of the transmission parameters without violating the interference requirement constraints for the rest of said plurality of femtocells; and performing said adjustment of interference requirement constraints by means of the next actions:

mutual communication between said first femtocell and at least said second femtocell of their mutual interference requirement constraints and of the variation in the values of at least part of their transmission parameters that they would experience when changing their mutual interference requirement constraints;

determination of the adjusted or updated mutual interference requirement constraints that allow to vary the values of at least part of the transmission parameters of said first and second femtocells without affecting the transmission performance of the rest of said plurality of femtocells; and setting of new values of at least part of the transmission parameters for said first and second femtocells according to said determination.

14. The method of claim 13, comprising performing said mutual communication of their mutual interference requirement constraints and of the variation in the values of the transmission parameters that they would experience when changing their mutual interference requirement constraints, between said first femtocell and at least part of said plurality of femtocells, and finding said second femtocell, out of said plurality of femtocells, as the one with which the adjustment of the mutual interference requirement constraints with the first femtocell is mutually beneficial regarding said variation in the values of at least part of the transmission parameters.

15. The method of claim 14, wherein said setting of new values of the transmission parameters for said first and second femtocells comprises:
- increasing the total transmission rate or reducing the total transmission power of said first femtocell; and/or
- increasing the total transmission rate or reducing the total transmission power of said second femtocell, and/or
- increasing the total transmission rate of said first femtocell and reducing the total transmission power of said second femtocell, or vice versa.

16. The method of claim 15, wherein said transmission parameter which values are to be varied and set is:
- transmission power, if said first femtocell can jointly satisfy the transmission rate requirements of all users connected there to, or
- transmission rate, if said first femtocell cannot jointly satisfy the transmission rate requirements of all users connected there to.

17. A method for decentralized managing of neighboring femtocells, comprising: mutual adjustment of interference requirement constraints between a first femtocell and at least a second femtocell of a plurality of femtocells, regarding their active users, in a decentralized manner, said mutual adjustment being performed on the basis of not affecting transmission performance of the rest of said plurality of femtocells; further comprising, once said interference requirement constraints mutual adjustment has been performed, setting new values for at least part of transmission parameters for said first and second femtocells; further comprising performing said adjustment of interference requirement constraints and setting of new values for at least part of the transmission parameters without violating the interference requirement constraints for the rest of said plurality of femtocells; and further comprising performing said adjustment of interference requirement constraints by means of the next actions:
- mutual communication between said first femtocell and at least said second femtocell of their mutual interference requirement constraints and of a variation in the values of at least part of their transmission parameters that they would experience when changing their mutual interference requirement constraints;
- determination of the adjusted or updated mutual interference requirement constraints that allow to vary the values of at least part of the transmission parameters of said first and second femtocells without affecting the transmission performance of the rest of said plurality of femtocells; and
- setting of new values of at least part of the transmission parameters for said first and second femtocells according to said determination.

18. The method of claim 17, comprising performing said mutual communication of their mutual interference requirement constraints and of the variation in the values of the transmission parameters that they would experience when changing their mutual interference requirement constraints, between said first femtocell and at least part of said plurality of femtocells, and finding said second femtocell, out of said plurality of femtocells, as the one with which the adjustment of the mutual interference requirement constraints with the first femtocell is mutually beneficial regarding said variation in the values of at least part of the transmission parameters.

19. The method of claim 18, wherein said setting of new values of the transmission parameters for said first and second femtocells comprises:
- increasing the total transmission rate or reducing the total transmission power of said first femtocell; and/or
- increasing the total transmission rate or reducing the total transmission power of said second femtocell, and/or
- increasing the total transmission rate of said first femtocell and reducing the total transmission power of said second femtocell, or vice versa.

20. The method of claim 19, wherein said transmission parameter which values are to be varied and set is:
- transmission power, if said first femtocell can jointly satisfy the transmission rate requirements of all users connected there to, or
- transmission rate, if said first femtocell cannot jointly satisfy the transmission rate requirements of all users connected there to.

* * * * *